United States Patent
Trethewey (10) Patent No.: US 8,403,092 B1
(45) Date of Patent: Mar. 26, 2013

(54) MOTORCYCLE SUSPENSION SYSTEM

(76) Inventor: Mark Trethewey, Auburn Township, OH (US)

( * ) Notice: Subject to any disclaimer, the term of this patent is extended or adjusted under 35 U.S.C. 154(b) by 164 days.

(21) Appl. No.: 12/800,132

(22) Filed: May 7, 2010

(51) Int. Cl.
 *B62D 61/02* (2006.01)
(52) U.S. Cl. .................................................... 180/227
(58) Field of Classification Search .............. 180/227; 280/124.157, 124.158, 124.159, 275, 283–287, 280/175
 See application file for complete search history.

(56) References Cited

U.S. PATENT DOCUMENTS

| | | | | |
|---|---|---|---|---|
| 5,487,443 A | * | 1/1996 | Thurm | 180/227 |
| 5,749,591 A | * | 5/1998 | Thurm | 280/284 |
| 6,003,628 A | * | 12/1999 | Jurrens et al. | 180/227 |
| 6,290,017 B1 | * | 9/2001 | Ito | 180/227 |
| 6,357,546 B1 | * | 3/2002 | Crosby, Jr. | 180/227 |
| 6,668,960 B1 | * | 12/2003 | Parker | 180/227 |
| 6,899,193 B1 | * | 5/2005 | Anibas | 180/227 |
| 7,011,174 B1 | * | 3/2006 | James | 180/227 |
| 7,497,294 B2 | * | 3/2009 | Tsujii et al. | 180/219 |
| 2002/0066611 A1 | * | 6/2002 | Lane et al. | 180/228 |

* cited by examiner

*Primary Examiner* — Toan To
*Assistant Examiner* — Robert A Coker
(74) *Attorney, Agent, or Firm* — Roger A. Gilcrest (57) ABSTRACT

A motorcycle suspension for a motorcycle, the motorcycle having a frame member, a swingarm member, and a pivot point about which the swingarm member rotates with respect to the frame member, the suspension system comprising an airbag mounted above the swingarm member pivot point and interposed between the frame member and the swingarm member and a shock absorber/dampener in a position below the swingarm member pivot point as used in the traditional Harley-Davidson Motorcycle Company® SOFTAIL® motorcycle type suspension position. The system optionally can be connected to an air compressor to adjust the pressure in the airbag member so as to control ride height, ride quality, payload capacity, or a combination thereof. The system optionally can also be connected to a controller, such as a microprocessor, that automatically adjusts the system to predetermined values in response to environmental and road conditions.

14 Claims, 5 Drawing Sheets

MOTORCYCLE SUSPENSION SYSTEM

RELATED APPLICATION DATA

None.

FIELD OF THE INVENTION

The present invention relates to a motorcycle suspension system and more particularly to a motorcycle suspension system to be used on motorcycles that use swing-arm type suspension systems, and to motorcycles containing same. In a preferred embodiment, the invention allows a motorcycle operator to adjust the ride height of a motorcycle by varying the pressure in an airbag, providing substantial ride height adjustment for motorcycles equipped with swing-arm type suspension systems.

BACKGROUND OF THE INVENTION

The use of airbags in suspension systems for swing-arm type motorcycle suspension systems, particularly Harley Davidson SOFTAIL® motorcycles is known in the prior art. The Harley Davidson SOFTAIL® motorcycle suspension system uses a swingarm that is pivotally attached to the rear frame or main frame side plates of the motorcycle. This allows the rear wheel assembly to move independently from the frame about a singular pivot point. The swingarm rotates about a pivot and allows the wheel to move in an arcuate motion. The swingarm has a pair of wheel mounts that are positioned and spaced to mount a wheel assembly and to provide proper orientation and location for the wheel relative to the motorcycle. The swingarm has a pair of supports at each wheel mount, each pair are positioned in a plane and radiate from the wheel mount to a support member that connects the pair of supports in a planar like orientation.

Transverse bars, or cross members link each of the wheel mounts in an upper location and a lower location providing proper spacing and structural rigidity for the swingarm. At an intermediate position, positioned between the upper and lower cross members, an additional transverse bar or cross member links each wheel mount. The intermediate cross member is tubular, and provides an axis for the swingarm to rotate about. Each of the support members has a hole that coincides with the tubular shaped cross member, providing a through-hole into which pivot bolts are inserted. Each support member is positioned adjacent to, and located inside, the frame and is therefore hidden by the main frame struts, giving the illusion of a motorcycle having no visible suspension system.

The standard or stock SOFTAIL® motorcycle uses a suspension system that incorporates two shock absorbers that are positioned in a parallel relationship to each other and are orientated so the longitudinal axis of the shock absorbers is parallel to the direction of travel of the motorcycle. One end of each of the shock absorbers is attached to the main frame. The other end of each of the shock absorbers is connected to a member that extends forward from the lower cross member of the swingarm. The main frame of the motorcycle hides the shock mounts from view, maintaining the appearance of the SOFTAIL® motorcycle.

Motorcycle airbag rear suspensions have been described in U.S. Pat. No. 6,003,628 (Dec. 21, 1999, herein after the '628 patent), U.S. Pat. No. 6,357,546 (Mar. 19, 2002, hereinafter the '546 patent), and U.S. Pat. No. 6,668,960 (Dec. 30, 2003, herein after the '960 patent), which are hereby incorporated by reference. The '628 and '546 patents are specifically designed for the Harley-Davidson SOFTAIL® rear suspension system. As a result of design constraints imposed by the desire to conceal the rear suspension mechanism, the SOFTAIL® suspension system utilizes an unusual spring and shock absorber arrangement wherein a pair of coil-over shocks are positioned under the frame in front of the swingarm. Unlike the shock absorber assemblies of virtually all other motorcycles, which compress when the swingarm rises, the SOFTAIL® coil-over shock units extend when the swingarm rises.

As a result of the design, airbag devices are not readily compatible with the SOFTAIL® suspension system. Accordingly, an essential element of the '628 patent is an elaborate sliding house mechanism that translates the extending or pulling motion of the SOFTAIL® suspension into a compressing or pushing motion. In contrast, the airbag component of the instant invention is positioned above the pivot point of the swingarm where it is properly situated to be compressed in response to a rising swingarm.

The '546 patent also features a complicated device to translate the extending or pulling motion of the SOFTAIL® suspension to a compressing motion for use with an airbag device. In this case, the invention comprises a pair of pivotally connected plates that share a common pivot axis with the stock SOFTAIL® swingarm and main frame. The lower section of one plate connects to a shock absorber mounted in the conventional SOFTAIL® shock location. The upper part of the pivoting plates accept an airbag, essentially extending the SOFTAIL® suspension above the swingarm frame axis to resemble a more modern swingarm suspension system.

The main problem with the '546 design is the inherent complexity of the added pivot mechanism. The system compresses the airbag in an arc using a bag bracket. The system also does not readily accept different types and sizes of airbags. The system is a scissor type mechanism, which requires more bearing and service areas that could prematurely wear, causing added drag and creating slow or rough action of the swingarm during compression of the airbag and on reversal extension of the airbag. The '546 design further lacks a means of dampening upon rebound travel of the suspension system (i.e., the extension action of the airbag), resulting in a rougher ride as this shock works in reverse—compressing as the shock gets longer and rebounding as it returns back to the shortened position. The system disclosed in the '546 patent is further limited in its range of motion and can be difficult to repair or replace.

Similarly, although the '960 patent discloses a suspension system that utilizes an airbag above the pivot point of the swingarm, it is designed for suspension systems where stock location of the dampener/shock absorber is also above the swingarm pivot point. Thus, such a system is not compatible with a SOFTAIL® type of suspension system. Further, the system of the '960 patent it fails to provide proper dampening through the use of a dampener/shock absorber in the stock or factory position on the motorcycle. This system is limited in its use and ease of adaptability to factory or stock bikes, because it requires complete removal and rebuilding of the shock dampener/shock absorber system. Accordingly, the '960 patent fails to provide an airbag system that provides ride comfort and ride height adjustability, that can be easily adapted to a SOFTAIL® type suspension.

The instant invention satisfies a need in the field of motorcycling by providing an airbag suspension system that can be fitted to motorcycles with a swingarm type rear suspension and that provides conventional compression and extension airbag action, combined with dampening action by a shock absorber located in the conventional SOFTAIL® shock absorber location, and while providing or preserving the comparatively concealed appearance of the suspension system desired in such SOFTAIL®type motorcycle frames. In addition, a preferred embodiment of the present invention discloses an arrangement that provides the dampening and shock absorbance function while permitting the adjustment of the ride height and/or the suspension movement.

SUMMARY OF THE INVENTION

The embodiments of the invention and the method described herein address the shortcomings of the prior art.

In general terms, the invention may be described as including the following:

A suspension system for a motorcycle comprising: 1) a frame member; 2) a swingarm member, the frame member and the swingarm member connected at a pivot point about which the swingarm member rotates with respect to the frame member; the frame member having a forward airbag engagement site and a forward shock absorber/dampener engagement site, the swingarm member having a rear airbag engagement site opposing the forward airbag engagement site, and a rear shock absorber/dampener engagement site opposing said forward shock absorber/dampener engagement site, the airbag engagement sites disposed above said pivot point, and the shock absorber/dampener engagement sites disposed below the pivot point; 3) an airbag adapted to provide a resistive force between the airbag engagement sites; 4) a shock absorber/dampener adapted to provide shock absorbance between the shock absorber/dampener engagement sites.

The present invention also includes a suspension for a motorcycle comprising: 1) a frame member; 2) a swingarm member, the frame member and the swingarm member connected at a pivot point about which said swingarm member rotates with respect to the frame member; 3) an airbag disposed, at least in part, above the pivot point and between the frame member and the swingarm member, the airbag governing the rotation of the swingarm member with respect to the frame member; and 4) a shock absorber/dampener disposed below the pivot point and between the frame member and the swingarm member, the shock absorber/dampener governing the rotation of the swingarm member with respect to the frame member.

Importantly, when the swingarm pivots upward with respect to the main frame, the airbag shortens longitudinally and comprises the compression stroke for the airbag. As the swingarm pivots downward with respect to the main frame, the airbag lengthens, which comprises the rebound stroke for the airbag. In contrast, because the shock absorber is located beneath the pivot point, the opposite applies. As the swingarm pivots upward the shock absorber, or dampener, lengthens. This lengthening movement constitutes the shock absorber/dampener's compression stroke. As the swingarm pivots downward, the airbag rebounds, and the shock absorber shortens, which shortening movement constitutes the shock absorber/dampener's stroke. Alternatively, the shock absorber/dampener could be mount, at least in part, above the pivot point. Mounted in such a way, the shock absorber/dampener compression and lengthening strokes would be reversed.

The forward airbag engagement site and the forward shock absorber/dampener engagement site may be separate pieces attached to the frame member or may also be part of the frame member itself. Similarly, the rear airbag engagement site and rear shock absorber/dampener engagement site may be separate pieces that are attached to the swingarm member, or may also be part of the swing arm member itself. In addition, the airbag need not be attached to both the frame member or the swingarm member to govern the movement of the swingarm member with respect to the frame member. The airbag may simply be attached to either the frame member or swing arm member and only come into contact with the other member when the members are a sufficient distance from one another. Further, the airbag may be disposed between the frame member and swing arm member, but not permanently connected to either. For example, the airbag could be mounted from below, and only interact with either the frame member or the swingarm member when they are a sufficient distance from one another.

As used herein, it will be understood that the invention encompasses the attachment, engagement, mounting and/or cooperation of individual parts or sub-parts, by any device, method or means not inconsistent with the function of the system.

This invention may be used as a stand-alone system replacing the stock or factory-supplied shock absorber, or may be added to the motorcycle in addition to the factory shock absorbers to enhance the rider's comfort and/or the motorcycle's load carrying capacity.

The system can incorporate the ability to adjust the ride height, rider comfort, and/or carrying capacity through the use of an on-board air compressor to allow for air to be added to, or released from, the airbag, while either riding or stationary. The system further may be configured to self adjust to a preset comfort or ride height with the use of one or more sensing devices that monitor ride height and/or suspension movement over distance, time, or both. The user may also adjust maximum ride height when stationary by the stops of the shock absorber.

As used herein, the term "ride height" will be understood as the ground clearance, and, in the field of motorcycles, is the amount of space between the base of the motorcycle tire and the underside of the frame; or, more properly, the shortest distance between a flat, level surface, and any part of the motorcycle other than those parts designed to contact the ground while the motorcycle is in motion (such as tires, etc.). This may be assessed and monitored as the real-time equilibrium position of the main frame with respect to the swingarm, typically measured when at the motorcycle is at rest but while upright (i.e., perpendicular to the ground and not leaning to one side or the other as when on a side stand) and with both tires in contact with the ground (and not with one or both tire elevated as, e.g., when on a center stand, swingarm stand, or a lift). From this general height, the motorcycle's frame member and swingarm will oscillate as the suspension system operates when the motorcycle is in motion.

Accordingly, in one embodiment of the present invention, the system is adapted to allow adjustment to the ride height.

In another embodiment, an air compressor is functionally connected to the airbag. The air compressor may fill the airbag with air or any other appropriate gas. In one embodiment, the air compressor may be adapted such that an operator of the motorcycle may adjust the air pressure, either by adding air to the airbag or releasing air from the airbag, while the motorcycle is either stationary or in motion. In one embodiment, the system comprises a remote input to the compressor.

In a further embodiment of the present invention, an air pressure gauge may be functionally connected to the airbag suspension system, wherein the air pressure gauge measures the pressure of the air in the system.

The present invention also includes an embodiment further comprising 1) a means of releasing pressure from the airbag, 2) an air pressure gauge functionally connected to the airbag;

3) an air compressor functionally connected to the airbag to supply compressed air to the airbag; 4) an electrical system functionally connected to the air compressor such that the air compressor can be operated while the motorcycle is stationary or in motion; 5) a sensing device adapted to monitor the real-time equilibrium position of the frame member with respect to the swingarm member and the real-time movement of the frame member with respect to the swingarm member and to transmit signals in response to same; and 6) a controller adapted to accept input signals and to signal the air compressor to supply compressed air to the airbag or to signal the means of releasing pressure from the airbag to release pressure from the airbag.

The present invention also provides for a system further comprising a sensing device wherein the sensing device monitors ride height, suspension movement, or both. The sensing device may be any type of sensor, or which several are commercially available. Vibration sensors, potentiometers, proximity sensors or sonar sensors could be adapted for such an application. In one embodiment, a micro-processor monitors the performance of the airbag suspension system, by either monitoring the air pressure in the airbag by way of the air pressure gauge, by monitoring suspension movement, by monitoring ride height, or by a combination thereof. The micro-processor may further adjust the air pressure in the airbag in response to air pressure in the airbag, the suspension movement, the ride height, or a combination thereof. Preferably, the operator will set predetermined factors such as ride height and ride comfort level, which are monitored and controlled by the micro-processor in response to environmental, road condition, or load changes.

DETAILED DESCRIPTION OF THE PREFERRED EMBODIMENTS

In accordance with the foregoing summary, the following describes a preferred embodiment of the present invention which is considered to be the best mode thereof. With reference to the drawings, the invention will now be described in detail with regard for the best mode and preferred embodiment.

Figure 1:
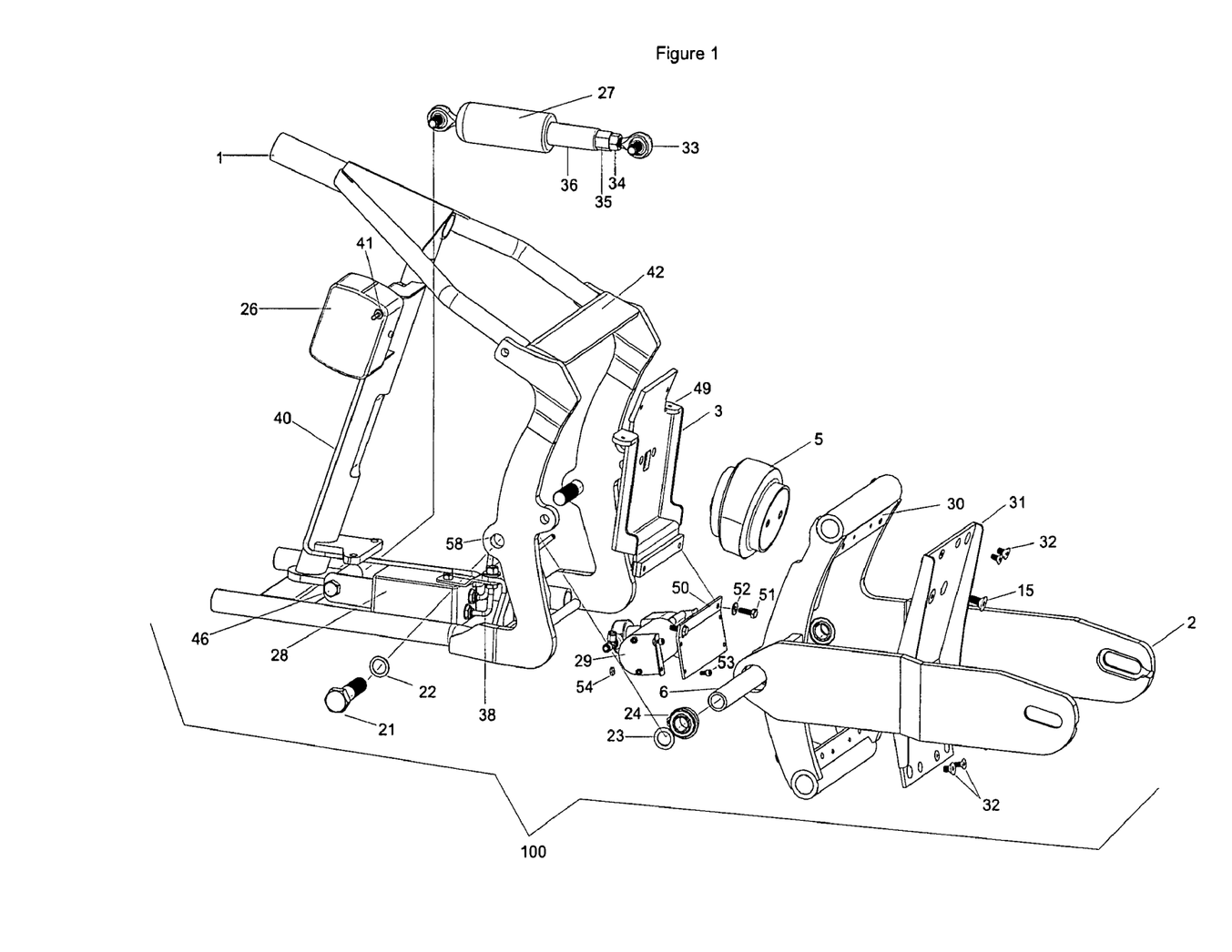
FIG. 1 is an exploded view of the motorcycle frame assembly in accordance with one embodiment of the present invention.

FIG. 1 illustrates an exploded view of the frame assembly 100 of the present invention. The frame assembly 100 has a frame member 1, which may be connected to a swingarm member 2, which may pivot with respect to the frame member 1. The frame member 1 may be connected to an airbag mount frame member 3 to which airbag member 5 may be attached. Additionally, airbag mount frame member 3 may be attached to rear frame cross member 42. A swingarm member 2 may include a pivot bearing member 24, pivot bearing spacer 23, pivot bearing tube 6, and airbag swingarm member 31. FIG. 1 also shows airbag swingarm member 31.

FIG. 1 further illustrates a pivot bearing member 24, pivot bearing spacer 23, swingarm fastening device 21, which threads into pivot tube 6, and washer 22 to space and fasten the swingarm member 2 to the frame member 1. The pivot bearing spacer 23 with the pivot bearing member 24 and the pivot bearing tube 6 allow the swingarm member 2 to pivot with respect to the frame member 1. A switch mount point 26 may also be connected to frame member 1 to house electrical components.

FIG. 1 further shows a shock absorber/dampener 27 attached to frame member 1. Shock absorber/dampener 27 may include shock piston 36 in addition to an adjusting lock nut 34 and adjustment member 35 for adjusting the shock absorber/damper 27 maximum length. Preferably, the user may adjust the adjustment member 35 to adjust the length of the shock absorber 27 and, as a result, adjust the maximum height that the user can raise the motorcycle travel height. FIG. 1 further shows the shock absorber/dampener 27 having two shock absorber ends 33, which may be connected to front shock mount 8 and a rear shock mount 9 (pictured in FIGS. 2 and 3).

FIG. 1 additionally illustrates a control box 28 which may be connected to the frame member 1 to include system components and/or a clean-air filter for the air compressor member 29, which may be positioned between the frame member 1 and a swingarm 2. The swingarm 2 may include a rear airbag mount attachment member 30 and a rear airbag member 31 to provide a mounting plate for the attaching fastening device 32 that fastens airbag 5 to rear airbag member 31. The air compressor member 29 may be attached to the air compressor mount plate 50 by a fastening device 53 which may include a nut 54 for the fastening device 53. The air compressor mount plate 50 may be further fastened to the airbag mount frame member 3 by a fastening device 51 and washer 52.

FIG. 1 further shows components that may be attached to swingarm 2 to attach a rear airbag mount attachment member 30 that is the fastening point for airbag swingarm member 31 using a fastening device 32. That may cooperate with the airbag member 5 and the pivot bearing tube 6. Pivot bearing tube 6 defines the pivot point about which swingarm 2 rotates with respect to frame member 1. An airbag swingarm member 31 may be positioned on the swingarm 2 at the rear airbag mount attachment member 30. A fastening device 32 may be attached to the rear airbag swingarm member 31 and rear airbag mount attachment member 30.

FIG. 1 additionally illustrates an air compressor mount plate 50 for mounting the air compressor member 29 and connects to the airbag mount frame member 3. A fastening device 51 connects the air compressor mount plate 50 to the airbag mount frame member 3. FIG. 1 illustrates a washer 52 for the fastening device 51 for the air compressor mount plate 50. FIG. 1 additionally illustrates a fastening device 53 to connect the air compressor mount plate 50 to the air compressor member 29 by a complementary fastening device 54 (e.g., a nut).

FIG. 1 further shows dump line to control box 38, which allows the release of air from the airbag member to lower the bike or adjust the rider comfort. FIG. 1 also shows harness 40, encasing the control wires leading to switch and electrical components 41. Lastly, FIG. 1 shows oil tank isolator pad mount 49.

Figure 2:
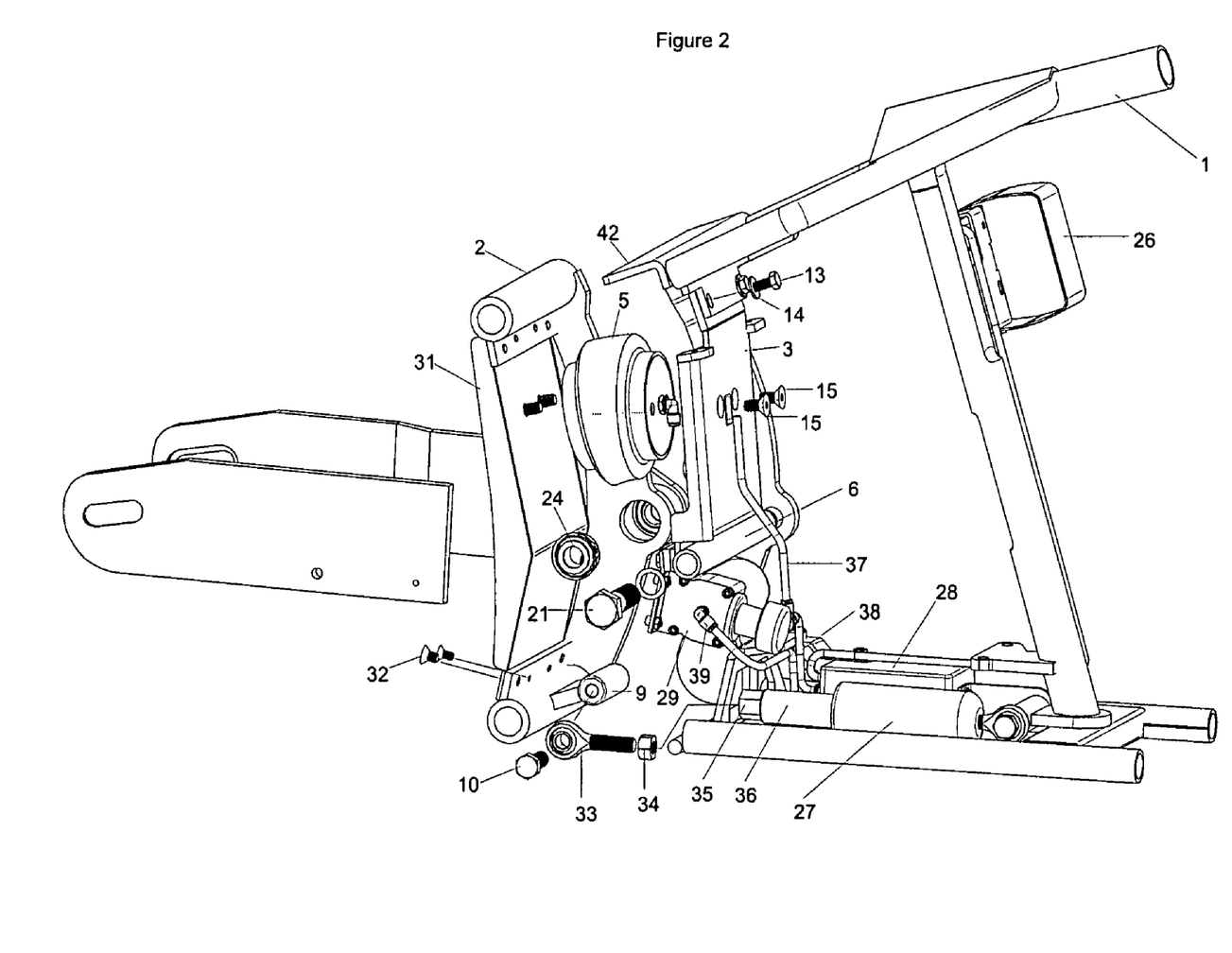
FIG. 2 is an exploded view of the motorcycle frame assembly in accordance with one embodiment of the present invention.

In addition to those parts discussed previously under FIG. 1, FIG. 2 illustrates a partial exploded view with components removed for visibility. FIG. 2 illustrates a shock absorber/dampener 27 with a shock absorber end 33, which connects to rear shock mount 9 via shock absorber fastening device 10, and an adjusting lock nut 34 to adjust and lock the shock piston 36. FIG. 2 further illustrates adjustment member 35 which may be equipped with wrench flats on the piston for adjusting the stop point of the shock piston 36. The shock piston 36 cooperates with the shock absorber/dampener 27. FIG. 2 additionally illustrates the pressure/dump valve passageway 37 which connects between the control box 28 and the airbag member 5. The dump line passageway 38 connects the control box 28 to the air compressor member 29 (as shown on FIG. 3). FIG. 2 additionally illustrates the fresh air passageway 39 that may connect the control box 28 to the air compressor member 29.

Figure 3:
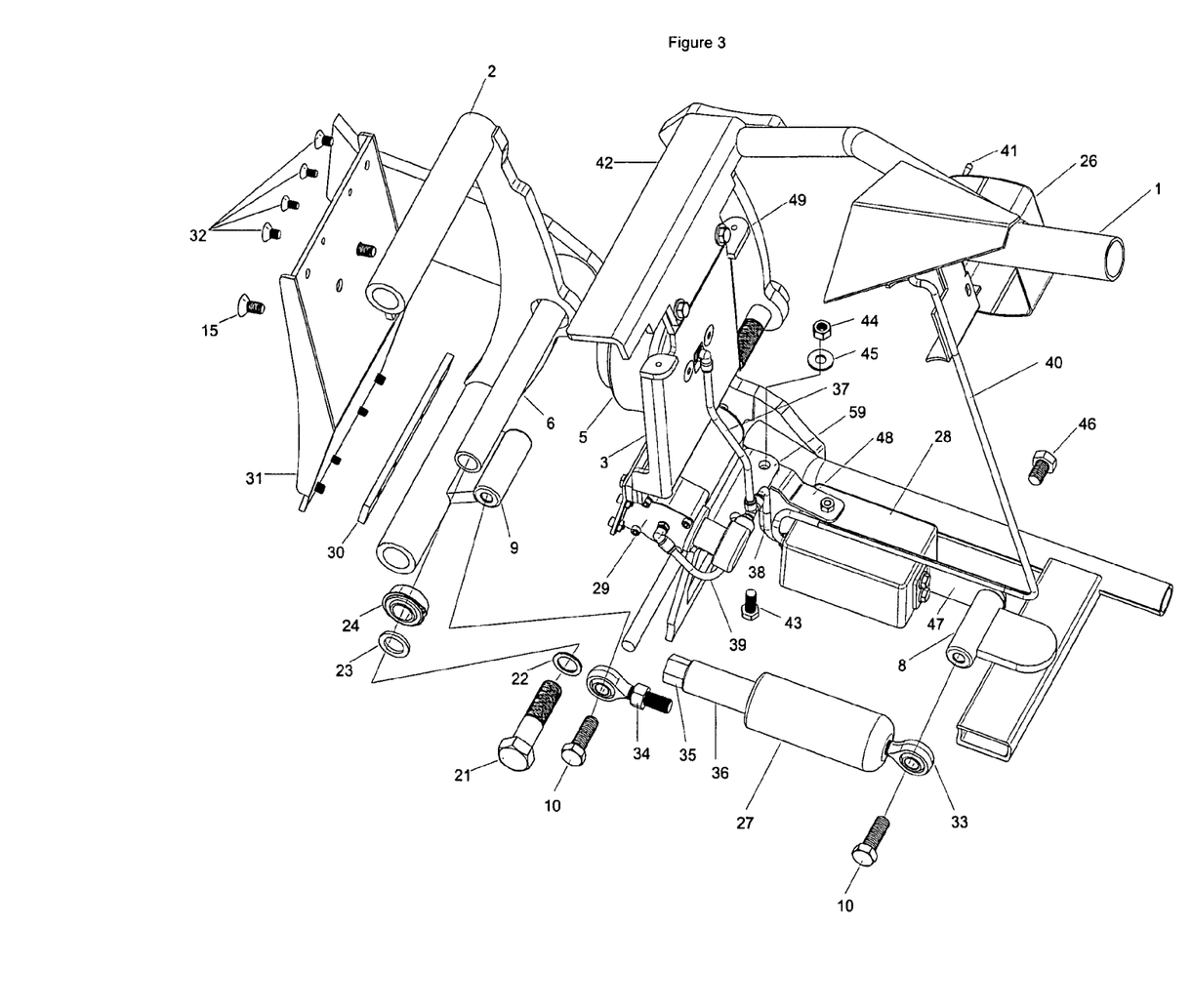
FIG. 3 is a top exploded view of the motorcycle frame assembly in accordance with one embodiment of the present invention.

FIG. 3 illustrates a top exploded and cutaway view of a portion of the frame assembly 100 and illustrates a control wire harness 40 to connect the control box 28 to the electrical control switch 41 which controls the air compressor from control box 28. FIG. 3 additionally illustrates a rear frame cross member 42 for connection to the airbag mount frame member 3. A rear control bracket mount fastening device 43 cooperates with a nut 44 and washer 45 to connect the rear control box mount bracket 48 to the lower rear frame cross member 59. A front control box bracket fastening device 46 connects the control box 28 to the forward shock mount 8. More specifically, the front control box bracket fastening device 46 connects the front control box mount bracket 47, which is connected to the control box 28, to the front shock mount 8. The rear control box mount bracket 48 connects the control box 28 to the frame member 1 via the lower attachment mount member 7. FIG. 3 additionally illustrates the oil tank isolator pad mount 49.

Figure 4:
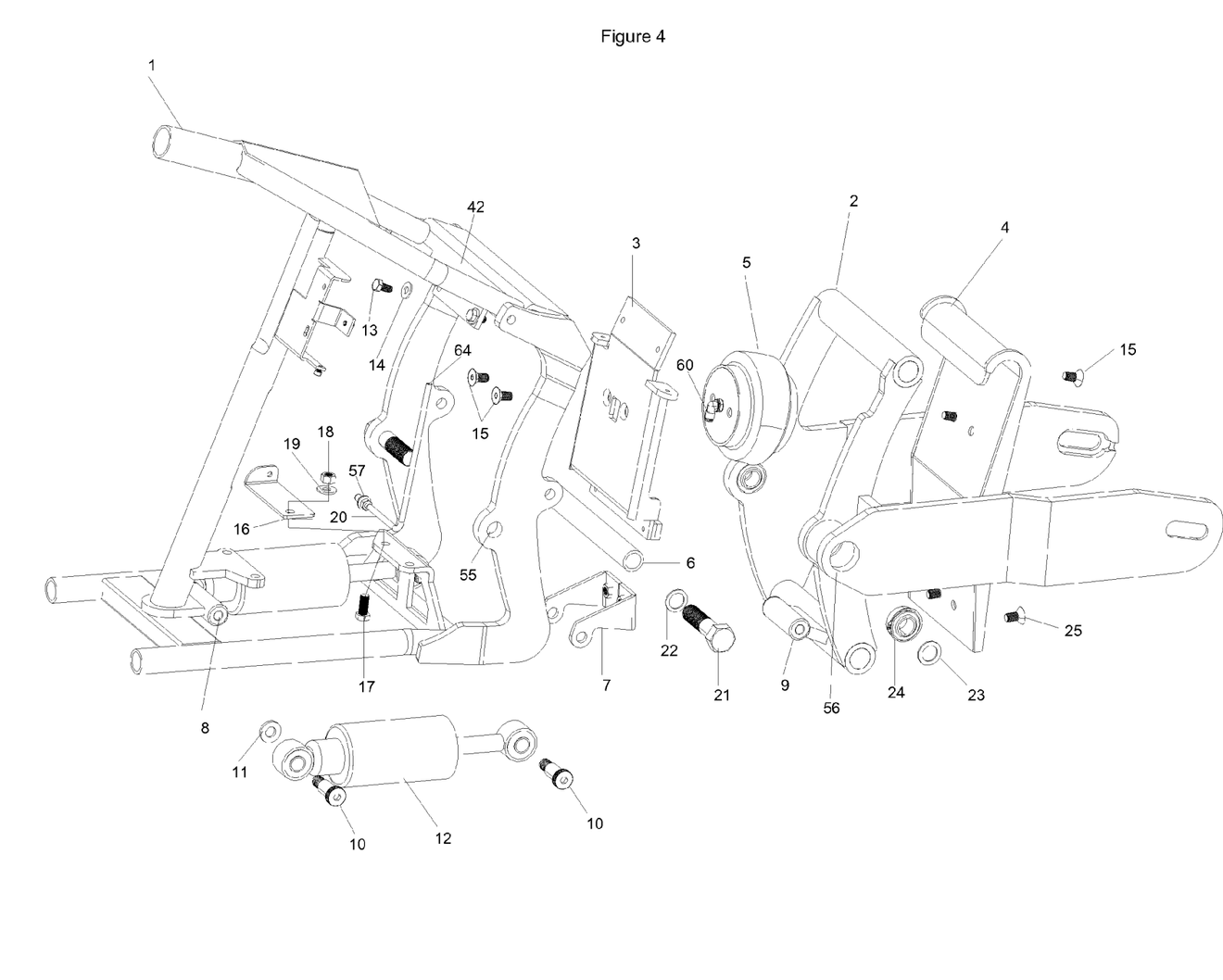
FIG. 4 is a partial exploded view of the motorcycle frame assembly in accordance with one embodiment of the present invention.
Figure 5:
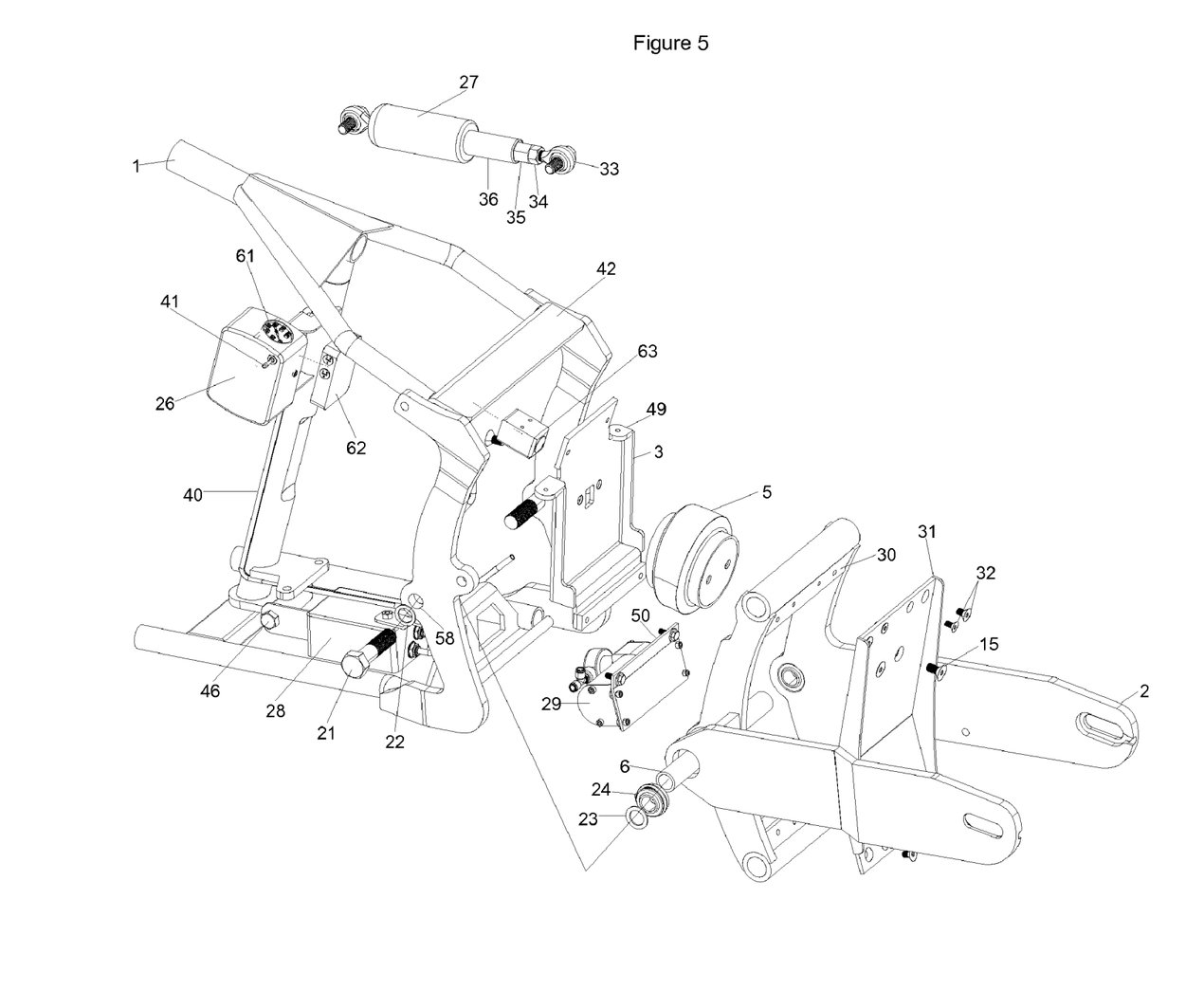
FIG. 5 is an exploded view of the motorcycle frame assembly in accordance with one embodiment of the present invention.

Turning now to FIG. 4, FIG. 4 illustrates an alternative embodiment of the present invention. FIG. 4 represents an embodiment wherein the airbag system may be used as additional load carrying support in addition to the two stock shock absorbers that are generally present in SOFTAIL® type suspension systems. FIG. 4 shows a rear airbag mount bracket 4 to cooperate with the swingarm member 2 and that may be positioned to the rear of the swingarm member 2. FIG. 4 additionally illustrates a lower attachment mount member 7, which may attach to rear shock mount 9 and extend forward from swingarm member 2, and further may be fastened by the rearward shock mount bolt 10. Lower attachment mount member 7 may also be attached to the bottom of rear airbag mount bracket 4 by fastening devices 25 extending through bracket 4 and lower attachment mount member 7 and may further be fastened with a nut.

A front shock mount 8 may be connected to the frame member 1 to mount the shock absorber 12 by connection via a shock mount fastening device 10 and spacer 11. FIG. 4 shows one or more forward airbag mount frame member attachment fastening devices 13 attached to the forward airbag mount and cooperates with washer 14. FIG. 4 additionally illustrates the mount plate 16 to mount the manual air inflation valve 57 attached on one end of air line 20 and the fastening device 17 for the mount plate 16. The attachment fastening device 17 may include a washer 19 and nut 18. Air line 20 connects to the airbag member 5 at one end, and the manual air inflation valve at the other end.

It will be understood that the present invention encompasses all mechanically, electromechanically, and pneumatically equivalent arrangements not inconsistent with the intended suspension, shock absorbance/dampening and optional control functions of the present invention, such as may be achieved through variations in mechanical shapes, the integration and disintegration of parts, and the use of variations in control and feedback mechanisms and systems.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

What is claimed is:

1. A suspension system for a motorcycle comprising:
   a. a frame member,
   b. a swingarm member, said frame member and said swingarm member connected at a pivot point about which said swingarm member rotates with respect to said frame member; said frame member having a forward airbag engagement site adapted to bear a first force from an airbag, and a forward shock absorber/dampener engagement site, said swingarm member having a rear airbag engagement site adapted to bear a second force from an airbag, and a rear shock absorber/dampener engagement site, wherein said forward airbag engagement site engages with said frame member above said pivot point, said rear airbag engagement site engages with said swingarm member above said pivot point, and said forward and rear shock absorber/dampener engagement sites are disposed below said pivot point;
   c. an airbag providing a first and second force between said forward and rear airbag engagement sites;
   d. a shock absorber/dampener adapted to provide shock absorbance between said forward and rear shock absorber/dampener engagement sites.

2. The system of claim 1 wherein said airbag has an amount of air that can be increased or decreased.

3. The system of claim 2 wherein said amount of air can be increased or decreased while said system is stationary or in motion.

4. The system of claim 2 further comprising a valve adapted to release air from said airbag.

5. The system of claim 1 further comprising a compressor in an air supply connection to said airbag.

6. The system of claim 5 wherein said compressor further comprises an electrical control system functionally connected to said compressor.

7. The system of claim 5 further comprising a remote input to said compressor.

8. The system of claim 1 further comprising a sensing device wherein said sensing device monitors real-time equilibrium position of said main frame with respect to said swing arm.

9. The system of claim 1 further comprising a sensing device wherein said sensing device monitors the real-time movement of said swingarm member with respect to said frame member.

10. The system of claim 9 further comprising a microprocessor functionally connected to said sensing device.

11. The system of claim 10 wherein said micro-processor is adapted to adjust said air pressure in said airbag based upon predetermined factors.

12. The system of claim 1 having a ride height and a ride height range, said ride height range comprising a first and second ride height wherein said ride height is adjustable between said first and second ride heights.

13. The system of claim 12 wherein said ride height automatically adjusts based upon predetermined factors.

14. The system of claim 1 further comprising:
a. means of releasing pressure from said airbag,
b. an air pressure gauge functionally connected to the airbag;
c. an air compressor functionally connected to said airbag to supply compressed air to said airbag;
d. an electrical system functionally connected to said air compressor such that said air compressor can be operated while said motorcycle is stationary or in motion;
e. a sensing device adapted to monitor the real-time equilibrium position of said frame member with respect to said swingarm member and the real-time movement of said frame member with respect to said swingarm member and to transmit signals in response to same; and
f. a controller adapted to accept input signals and to signal said air compressor to supply compressed air to said airbag or to signal said means of releasing pressure from said airbag to release pressure from said airbag.

* * * * *